United States Patent [19]

Yasuda et al.

[11] 4,051,620
[45] Oct. 4, 1977

[54] FISHING DEVICE HAVING A FLOAT

[76] Inventors: Hiromi Yasuda, 3482, Maiokacho, Totsuka, Yokohama, Kanagawa; Tokuichi Yasuda, 96, Aza-ohirama, Oazanada, Mugimachi, Kaibe, Tokushima, both of Japan

[21] Appl. No.: 712,341

[22] Filed: Aug. 6, 1976

[51] Int. Cl.² ............................................ A01K 97/02
[52] U.S. Cl. ................................................ 43/44.99
[58] Field of Search ...................... 43/44.99, 44.9, 41, 43/41.2

[56] References Cited

U.S. PATENT DOCUMENTS

| | | | |
|---|---|---|---|
| 2,498,815 | 2/1950 | McVay | 43/44.9 |
| 2,844,907 | 7/1958 | Merton | 43/44.99 |

FOREIGN PATENT DOCUMENTS

| | | | |
|---|---|---|---|
| 907,251 | 6/1945 | France | 43/44.99 |
| 949,358 | 2/1964 | United Kingdom | 43/44.99 |

*Primary Examiner*—Warner H. Camp
*Attorney, Agent, or Firm*—Browdy and Neimark

[57] ABSTRACT

The fishing device having a float readily slidable along a fishing line between a stopper and a swivel element. The fishing device includes a basket for scattering baits, the basket being divided into an upper part and a lower part. The upper part is unremovably connected to the fishing float; baits contained therein may be scattered out into water through its opened bottom when the basket is divided. The lower part of the basket readily slides down along the fishing line until it is stopped; baits contained therein may be scattered out little by little into water.

The swivel element is provided with the fishing line. The line leads to a sinker to which a leader having a hook or lure at its terminal end is connected.

2 Claims, 3 Drawing Figures

FISHING DEVICE HAVING A FLOAT

BACKGROUND OF THE INVENTION

The present invention relates to a fishing device having a float which is used for fishing and, more particularly, relates to such a float with which a basket for scattering baits is provided.

Known fishing equipment provides separately a basket for scattering baits and a float with a fishing line. The basket for scattering baits is placed near the leader to the terminal end of which lure or hook is attached and the float is set away from the basket on the fishing line. When such known fishing equipment is used for fishing there is the distinct disadvantage that after landing on the water the basket for scattering baits moves slowly downwardly through water beneath the float until it is settled to the expected position. Since a considerable period of the time elapses until the basket is settled to the expected position, the baits contained in the basket are mostly scattered out before the basket is in place. Thus, the purpose of attracting fishes by scattering baits has never been attained sufficiently by use of such known fishing equipment.

SUMMARY OF THE INVENTION

An object of the present invention is to provide a fishing device which avoids the above-noted disadvantage of the known fishing equipment.

Another object of the present invention is to provide an improved fishing device having a float readily slidable along the fishing line with which a basket for scattering baits is provided so that at the same time when the fishing float is landed on the water the basket is also landed and functions to supply baits effectively in the vicinity of its associated hook or hooks over a long period of time.

A further object of the present invention is provide an improved fishing device having a basket for scattering baits which is divided into two parts, i.e. upper part and lower part, the upper part in operation being still attached to the fishing float but opened so that the baits contained therein are eventually scattered via its open bottom out into the water while the lower part readily slides along the fishing line until it is stopped by a swivel element so that the baits contained therein may be scattered little by little over a relatively long period into the water.

An additional object of the present invention is to provide a fishing device having a very sensitively reactionable fishing float which is readily slidable along the fishing line even through initially associated with a basket because the divided upper part of the basket will be soon vacant of bait after landing on the water.

Still another object of the present invention is to provide an improved fishing device having a readily moveable stopper on the fishing line to control the length of the fishing line below the fishing float according to expected kind of fish so that fishing may be effectively carried out.

The foregoing objects are achieved in accordance with the present invention by providing an improved fishing device having a fishing float, a basket, a fishing line, a swivel element and a stopper. The fishing line controls the position of a fishing float, between the stopper and the swivel element the fishing float and the basket for scattering baits are placed so that they are readily slidable, the basket may be divided in upper part and lower part and the upper part is attached to the float.

BRIEF DESCRIPTION OF THE PREFERRED EMBODIMENT

Further details of the present invention will be hereunder explained with reference to the drawings.

DETAILED DESCRIPTION OF THE PREFERRED EMBODIMENT

Figure 1:
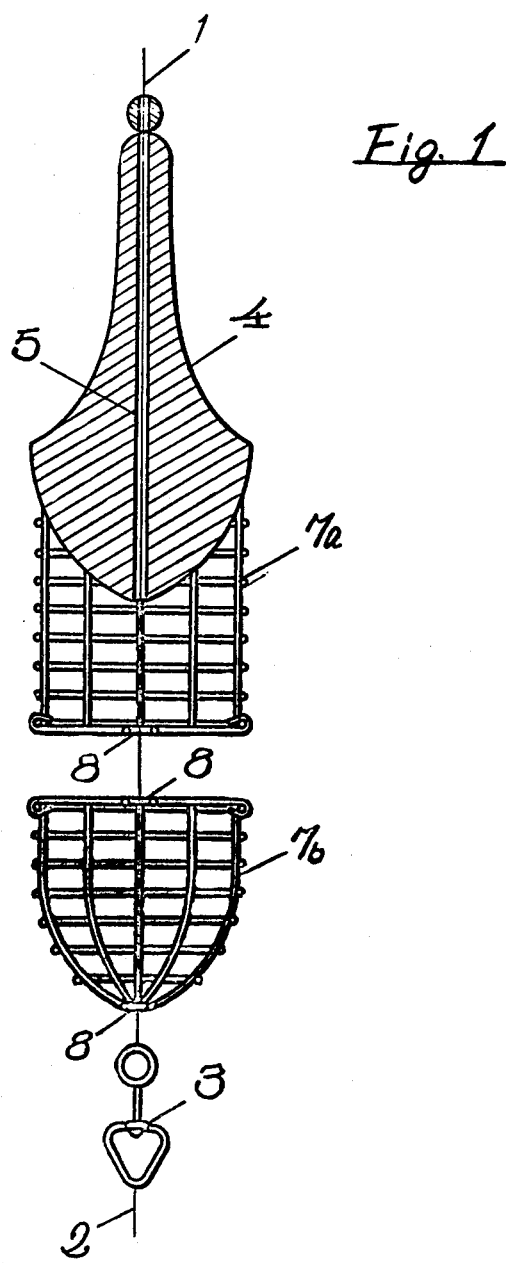
FIG. 1 is a longitudinal section of an exemplary embodiment of a fishing device having a float according to the present invention.

As shown in the drawing figures, a fishing line 1 is connected to the top of a fishing rod or a reel fixed on the rod. A leader 2 is provided, a lure or hook 10 is attached to the terminal end of the leader. The other end of the leader 2 is connected to the fishing line via a swivel element 3. A fishing float 4 is provided with a line passing hole longitudinally provided therein, the fishing line 1 is passed through that hole and the fishing float should on the fishing line 1 so that the float 4 is readily slidable along the fishing line 1. The fishing float 4 may take any form which is made of wood, plastics or the like. A stopper 6 e.g., a rubber ring is adjustabley fixed on the upper part of the fishing line 1 thus the location of the fishing float 4 may be controlled by adjustment of the position of the stopper 6. A basket 7a, 7b for scattering baits has a central part in the form of a leading ring 8 longitudinally provided and the fishing line 1 is passed through the leading ring 8 and the basket 7a, 7b for scattering baits is so held that it is readily slidable along the fishing line 1. The basket 7a, 7b for scattering baits has meshes through which baits to be scattered such as mysid, small shrimp, whitebait and the like may be passed. The basket 7a, 7b may be therefore made of wire net or of metal plate with which proper size of holes provided therein or may be made of plastic providing proper size of meshes or holes. The basket 7a, 7b for scattering baits is so constructed that it is divided into an upper part 7a and a lower part 7b. The upper part 7a is attached to the bottom of the fishing float 4 so that it is readily slidable together with the fishing float. The lower part 7b may be slidable or may be fixed to the swivel element 3. In addition, a sinker 9 which is fixed on the leader 2 which carries the lure or hook 10.

Figures 2A, 2B:
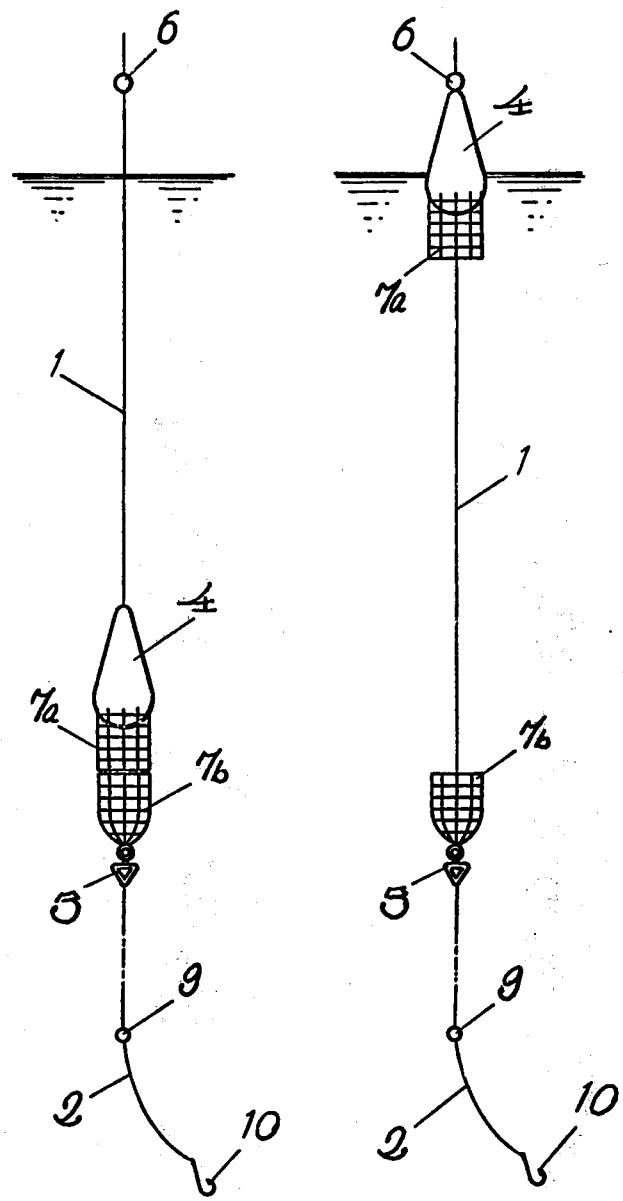
FIGS. 2A and 2B are respective side views of the fishing float shown in FIG. 1 in its working environment.

In use, a bait is placed on the hook 10 of the fishing equipment constructed as above disclosed, and baits to be scattered are placed in both or one or the other of the upper part 7a and the lower part 7b of the basket and the fishing float 4 is put down so that the upper part 7a may be connected to the lower part 7b. Thereafter by use of a fishing reel or the like the fishing equipment is thrown on the water and the basket 7a, 7b for scattering baits may sink to the expected depth immediately after its landing on the water as shown in FIG. 2A. However the fishing float either remains on the surface of water where it was landed or, if the fishing float 4 was sunk together with the lower part 7b of the basket, it may be floated up along the fishing line 1 to the surface of water in a few seconds because the fishing line is linearly extended as shown in FIG. 2B. The fishing float 4 is stopped by the stopper 6 which has been previously adjusted so that hook or lure 10 may be placed properly at the expected level. In addition the baits contained in the upper part 7a are immediately scattered out into the water because its bottom face is opened and the baits contained in the lower part 7b are then passed through its netting out in water little by little.

Therefore when the fishing equipment of the present invention is used baits may be extremely effectively scattered so that expected fishes will gather around the hook or lure 10 and such fishes may be unexpectively caught very frequently.

Furthermore when the fishing equipment of the present invention is used the length between the fishing float 4 and the hook or lure 10 may be controlled by the stopper 6 so that hook or lure may be located to the proper level suitable for reaching expected fishes.

Additionally when the fishing equipment of the present invention is used there is no necessity to settle the fishing float 4 to a defined position of the fishing line 1. No excessive load is therefore hung on the fishing float 4 which may be accordingly floated and thus may react very sensitibly by movements of fish.

What is claimed is:

1. A fishing device which scatters baits at two distinctively different rates over a fishing site, the device comprising, in combinaton; a fishing line; a stopper on said line; a swivel element connected to one end of said line; a float positioned about said line and slidable along said line between said stopper and said swivel element; and an apertured basket for containing and scattering baits positioned about said line and slidable along said line, said basket including a lower part and an upper part separable therefrom, said upper part being fixedly connected to said float, being floatable therewith and having a substantially open downwardly facing end when separated from said lower part; whereby upon placing the device into water with baits in the basket, the float and the upper part rise along the fishing line to the surface of the water causing baits in said upper part to be immediately scattered over the fishing site from its substantially open end and the lower part to descend along the fishing line to the swivel element so as to discharge baits therefrom over the fishing site during a period of time.

2. A fishing device according to claim 1, including at least one leader having at least one lure or hook on an end thereof connected to said swivel element.

* * * * *